No. 838,838. PATENTED DEC. 18, 1906.
J. C. BACKUS.
TIRE.
APPLICATION FILED DEC. 12, 1905.
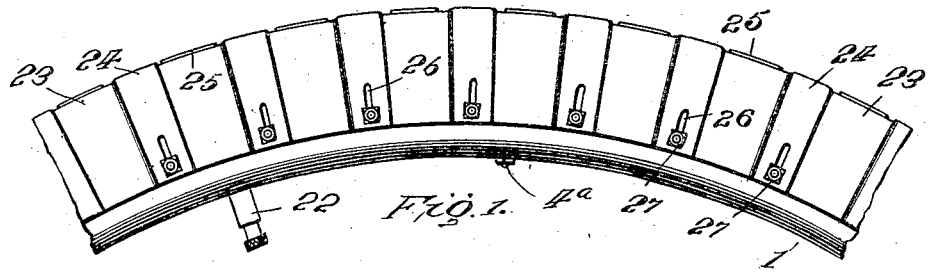
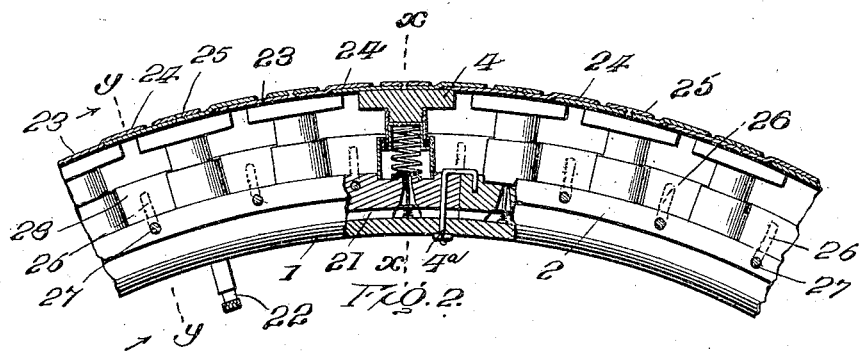
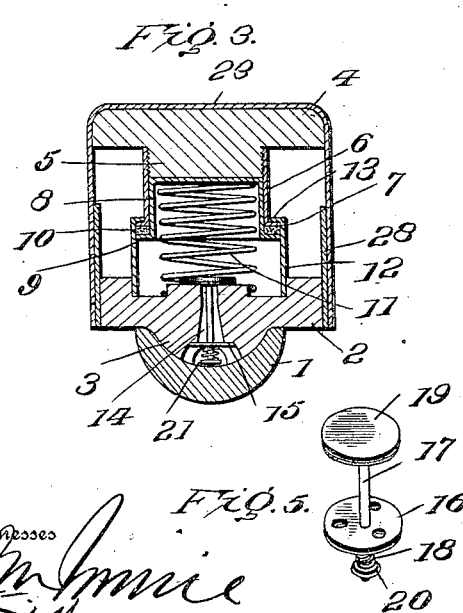
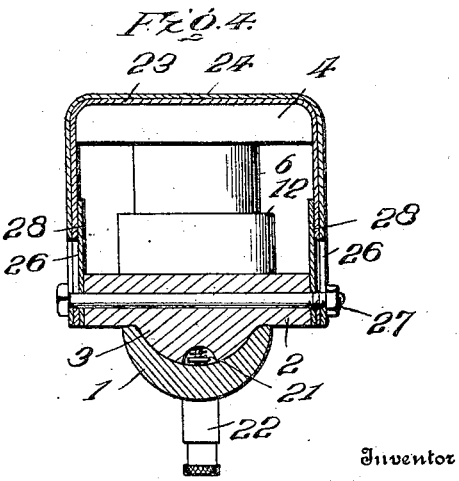
Inventor
J. C. Backus,

UNITED STATES PATENT OFFICE.

JOHN C. BACKUS, OF SMETHPORT, PENNSYLVANIA.

TIRE.

No. 838,838.      Specification of Letters Patent.      Patented Dec. 18, 1906.

Application filed December 12, 1905. Serial No. 291,470.

*To all whom it may concern:*

Be it known that I, JOHN C. BACKUS, a citizen of the United States, residing at Smethport, in the county of McKean and State of Pennsylvania, have invented certain new and useful Improvements in Tires, of which the following is a specification.

For the comfort and ease of persons using conveyances, as also to obviate the rumbling noise of metal-tired wheels when passing over cobble and like stone pavements, yieldable tires have been devised. Of the different varieties pneumatic tires have given the best results; but such tires are objectionable because of their liability to puncture and the cost incident to maintaining the tires in good condition.

This invention aims to provide a tire possessing all the advantages of a pneumatic tire, to which may be added the qualities of a metallic tire which is wear-resisting and practically invulnerable and which is self-inflating, not liable to collapse in the event of a portion becoming pierced, and which is durable and not liable to derangement or getting out of repair after a short period of service.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a portion of the rim or tire of a vehicle-wheel embodying the invention. Fig. 2 is a view of the parts shown in Fig. 1, having parts broken away and the sheath or casing in section. Fig. 3 is a transverse section on the line $x\ x$ of Fig. 2, showing the parts on a larger scale. Fig. 4 is a transverse section on the line $y\ y$ of Fig. 2 looking in the direction of the arrows and showing the parts on a larger scale. Fig. 5 is a detail perspective view of one of the valves.

Corresponding and like parts are referred to in the following description and indicated in all the views of the drawings by the same reference characters.

The tire comprises a sectional construction, the inner section being relatively fixed and the outer or tread section yieldable radially, the two sections being normally pressed apart by spring and pneumatic action. For convenience the inner or rim portion of the tire is composed of a plurality of sections, which abut and unitedly form a continuous ring encircling the rim or felly of the wheel to which the tire is fitted. The outer or tread section is composed of a series of pressure members, which are normally spaced apart to make provision for free radial movement of the section without interference. A sheath or casing envelops the tire and excludes mud and other foreign matter and prevents the same having ready access to the telescoping members of the complemental and slidably-related parts.

The rim or felly of the wheel is indicated at 1, the same being of ordinary formation and channeled in its outer circumference to form a seat for the tire. The inner or rim portion 2 of the tire is provided upon its inner side with a half-round portion 3 to fit and obtain a seat in the outer or grooved side of the rim 1, so as to prevent relative lateral displacement of the tire when in position. The rim portion 2 is composed of a plurality of sections which have their ends abutted and connected in any manner. As shown most clearly in Fig. 2, a hook-bolt $4^a$ has one leg passed through corresponding openings in an end portion of a section and in the rim 1, the hook entering an opening in the end portion of the adjacent section. It will thus be seen that the hook-bolt or fastening $4^a$ serves to connect the abutting ends of adjacent rim-sections to each other and to the rim. The tread-section is composed of a series of pressure members 4, which are spaced apart to admit of free radial movement thereof when the tire is in active operation. Each pressure member 4 has telescopic connection with the rim portion of the tire and is provided at a central point with a boss 5, to which a tube 6 is fitted, said tube 6 having an outer flange 7 at its free end. A second tube 8 is snugly fitted within the tube 6 and has an outer flange 9 at its free end, a packing 10 being confined between the flanges 7 and 9. The inner end of the tube 8 is closed and bears against the boss 5 and receives the end thrust of a coil-spring 11. A tube 12 projects from the rim portion and is provided at its free end with an inner flange 13, which overlaps the flange 7 of the tube 6 and limits the outward movement of the two tubes.

The packing 10 and confining-flanges 7 and 9 constitute, in effect, a piston by means of which a tight joint is maintained between the two telescoping parts. The inner flange 13 and the piston form a stop to limit the separation or outward movement of the telescoping parts. The spring 11 is of the expansible type and normally exerts a pressure to hold the telescoping parts at the limit of their outward movement. The telescoping parts unitedly form a pneumatic device which is designed to sustain the load that may be imposed upon the tire. Each pneumatic device is provided with a valve-controlled inlet 14, which is formed in the rim portion of the tire and which is enlarged toward the side of the rim portion lying adjacent to the rim 1, said inlet-opening being shouldered near its outer end, as shown at 15, to receive and support a washer 16, which forms a guide for the valve-stem 17 and an abutment for one end of a spring 18, coöperating with the valve 19 to normally hold the same seated. The valve 19 opens inward with reference to the pneumatic device and closes outward. A nut 20, mounted upon the threaded end of the valve-stem 17, constitutes an adjustable stop by means of which the tension of the spring 18 may be regulated, said spring being confined between said nut and the washer 16. The washer 16 is perforated to admit of the free ingress of air.

An annular air-passage 21 is provided between the meeting faces of the rim 1 and tire and is preferably formed in the latter and is in communication with each of the air-inlets 14 and with an inlet 22. The tread-sections 4 when occupying the lowermost position receive and sustain the load and tend to move inward thereunder. The air confined between the telescoping members of the lowermost pneumatic device or devices sustains the load, together with the action of the coöperating spring or springs 11. In the event of the tread-sections yielding to any great extent under the weight of the load they will be returned to normal position when relieved of the load by the action of the springs 11 regaining themselves, and this action will cause a certain amount of air to be drawn into the pneumatic device through the valve-controlled inlet, as will be readily understood. The pneumatic devices are successively brought into position for sustaining the load and are successively relieved of the compressive force, and the reciprocating movement of the slidable members of the pneumatic devices serves to supply the air necessary to form a cushion for effectively sustaining the load. The inward opening and the outward closing of the valves 19 admits of air passing readily into the pneumatic devices and confining said air so as to sustain the load.

From the foregoing it will be understood that the pneumatic devices are self-inflating and are maintained in prime working condition by the alternate compressive force and released from said compressive force due to the rotation of the wheel equipped with a tire embodying the invention. It is also noted that the disabling of any one or more of the pneumatic devices does not affect the tire as a whole or cause a collapse thereof, as is the case with a pneumatic tire of ordinary construction.

It has been found expedient to inclose the working parts of the tire, and for this purpose a sheath or casing is employed and the same is of sectional formation to obviate binding and admit of yielding of the tire, so as to neutralize shock and vibration. The sheath or casing is composed of a plurality of U-shaped sections 23, which are arranged to close the tread and opposite side portions of the tire. An end portion 24 of each section 23 is flared so as to overlap the end portion of the adjacent section, as indicated most clearly in Fig. 2, the lap-joint being sufficiently broad to exclude foreign matter and prevent gaping of the sections. The lapped joint is arranged to come opposite to the spaces formed between the pressure or tread sections 4, so as to sustain the load and prevent indenting of the sheath or casing between the parts 4. Filling-pieces 25 are attached to the intermediate outer or tread portions of the sections 23 and come between the lap-joints, thereby causing the tire to run upon a practically continuous tread-surface. The filling-pieces 25, jointly with the flared end portions 24, result in the provision of a corrugated or roughened tread portion which is of advantage to prevent slipping of the tire in the event of the wheel equipped with the same being utilized as a driver. The side portions of each section 23 are formed with slots 26, through which a bolt or fastening 27 passes, said bolt or fastening extending transversely of the rim portion 2 of the tire and serving to connect the sheath or casing thereto. A ring 28 is applied to each side of the rim portion 2 and comes between the latter and the side portions of the sheath or casing. The rings 28 overlap the slots 26 in the sections of the sheath or casing and prevent entrance of mud, dust, and the like through said slots into the space inclosed by the sheath or casing, and in addition to their dust-excluding function the said rings assist in supporting the side walls of the tire-covering and maintain the tire practically rigid as against any sidewise motion. The rings 28 project outward from the rim portion 2 a distance to engage with the pressure or tread sections 4 and limit their inward movement should the pneumatic device fail to operate and sustain the load, thereby preventing injury to the telescoping members and adjunctive parts. The rings 28 are secured to the rim portion 2 by the same bolts or fastenings 27 which hold the sections 23 in place. It is to be understood that provision is had for free movement of the sections 23 both radially and the one upon the other in the circumferential length of the tire, so as to obviate any possible binding.

Having thus described the invention, what is claimed as new is—

1. A tire comprising inner and outer portions, intermediate self-inflating pneumatic devices, and springs coöperating with said pneumatic devices for sustaining the load and to force the movable sections outward, whereby the pneumatic devices are charged with air as occasion may require.

2. A tire comprising inner and outer portions, tubes projected outward from said inner portion and having inner flanges at their outer ends, complemental tubes projected from the outer portion and telescoping with the tubes attached to said inner portion and having outer flanges for coöperation with the tubes with which they telescope, and means for supplying the telescoping tubes with air.

3. In a tire, the combination of inner and outer portions, a tube projected from one of said portions and having an inner flange at its free end, other tubes projected from the other part of the tire and closely fitted the one within the other and having spaced outer flanges, a packing fitted between said spaced flanges and jointly therewith forming a piston, and means for charging the telescoping tubular members with air as occasion may require.

4. In combination, a rim, a tire comprising a rim and tread portions and intermediate self-inflating pneumatic devices, the rim portion of the tire comprising abutting sections and the tread portion consisting of spaced pressure members, and means for securing the abutting ends of adjacent rim-sections to one another and to the rim.

5. In combination, a rim, a tire fitted to the rim and having an annular passage between the meeting faces of the rim and tire, said tire comprising a series of self-inflating pneumatic devices, each having a valve-controlled air-inlet opening into said annular air-passage.

6. In combination, a rim channeled in its outer side, a tire having a projecting portion seated in the channel of the rim and having a groove to form an annular air-passage between said rim and tire, the latter comprising a series of self-inflating pneumatic devices, each having a valve-controlled air-inlet in communication with said air-passage.

7. A tire comprising inner and outer portions and a series of intermediate yieldable devices and a sheath or casing inclosing the parts of the tire and formed of a plurality of sections having overlapped joints and slidable radially and in the circumferential length of the tire.

8. A tire comprising inner and outer portions and a series of intermediate yieldable devices and a sheath or casing inclosing the parts of the tire and formed of a plurality of sections having overlapped joints and slidable radially and in the circumferential length of the tire, and filling-pieces applied to the tread portion of the casing intermediate of the overlapped joints between the sections.

9. A tire comprising spaced tread or pressure members yieldably supported, and a sheath or casing composed of sections having their end portions overlapped and arranged opposite to the spaces formed between adjacent pressure or tread sections.

10. In combination, a rim portion, a tread portion, intermediate yieldable devices for forcing said inner and outer portions apart to sustain the load, a sheath or casing inclosing the tread and opposite side portions of the tire and having their end portions overlapped and their side portions slotted, and fastenings operating in said slots and serving to connect the sections of the sheath or casing to one another and to the rim portion.

11. In combination, a rim portion, a tread portion, intermediate yieldable devices for forcing said inner and outer portions apart to sustain the load, a sheath or casing inclosing the tread and opposite side portions of the tire and having their end portions overlapped and their side portions slotted, fastenings operating in said slots and serving to connect the sections of the sheath or casing to one another and to the rim portion, and rings arranged upon opposite sides of said rim portion and closing the slots in the side portions of the sections of the sheath or casing.

12. In combination, a rim portion, a tread portion, intermediate yieldable devices for forcing said inner and outer portions apart to sustain the load, a sheath or casing inclosing the tread and opposite side portions of the tire and having their end portions overlapped and their side portions slotted, fastenings operating in said slots and serving to connect the sections of the sheath or casing to one another and to the rim portion, and rings arranged upon opposite sides of said rim portion and closing the slots in the side portions of the sections of the sheath or casing, said rings and sections being held to the rim portion of the tire by the same fastening means.

In testimony whereof I affix my signature in presence of two witnesses.

JOHN C. BACKUS. [L. S.]

Witnesses:
 HALLIE A. WALKER,
 V. B. BONTON.